United States Patent [19]

Maltz

[11] 4,436,731
[45] Mar. 13, 1984

[54] SEMI-SYNTHETIC CHITIN DERIVATIVE, THE PROCESS FOR ITS PREPARATION, AND THERAPEUTIC COMPOSITIONS WHICH CONTAIN IT AS ACTIVE PRINCIPLE

[75] Inventor: Javier E. Maltz, Buenos Aires, Argentina

[73] Assignee: Etablissement Texcontor, Vaduz, Liechtenstein

[21] Appl. No.: 363,825

[22] Filed: Mar. 31, 1982

[30] Foreign Application Priority Data

Apr. 6, 1981 [IT] Italy ............................. 20953 A/81

[51] Int. Cl.³ .................. A61K 31/73; C08B 37/08
[52] U.S. Cl. .................................... 424/18.0; 536/20
[58] Field of Search ................ 536/20, 55.1; 424/180

[56] References Cited

U.S. PATENT DOCUMENTS 2,842,049 7/1958 Delangre ........................ 536/20
4,195,175 3/1980 Peniston et al. ................. 536/20

FOREIGN PATENT DOCUMENTS 419529 3/1974 U.S.S.R. ........................ 536/20

OTHER PUBLICATIONS

March, *Advanced Organic Chemistry* 2nd ed., 1977, p. 377.

*Primary Examiner*—Johnnie R. Brown
*Assistant Examiner*—Elli Peselev
*Attorney, Agent, or Firm*—Stevens, Davis, Miller & Mosher

[57] ABSTRACT

A new polysaccharide constituted by units of D-glucosammonium salts, prepared from natural chitin. The new product has strong hypocholesterolemic activity.

5 Claims, No Drawings

SEMI-SYNTHETIC CHITIN DERIVATIVE, THE PROCESS FOR ITS PREPARATION, AND THERAPEUTIC COMPOSITIONS WHICH CONTAIN IT AS ACTIVE PRINCIPLE

This invention relates to a new semi-synthetic chitin derivative, the process for its preparation starting from natural chitin, and compositions of hypocholesterolemic activity suitable for human therapy which comprise it as their active principle.

Chitin is known to be a natural polysaccharide widely distributed in nature, which is constituted essentially by N-acetyl-D-glucosamine units, of formula:

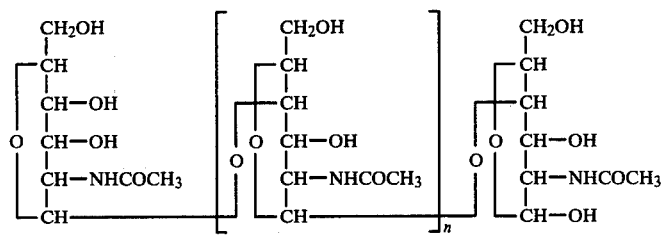

in which n is a whole number between 1000 and 2000.

Chitosan, a product obtained from chitin by total deacetylation using strong alkalis, and its hydrochloride, indicated briefly as chitosan-Cl, are also known.

Using these products, pharmacological tests on the rat were recently carried out, for the purpose of identifying any hypocholesterolemic activity. The tests were carried out in comparison with cholestyramine, a well known hypocholesterolemic agent constituted by a polymer comprising styrene crosslinked with divinylbenzene. From these tests, it was found that whereas chitin does not act on the cholesterol in any way, chitosan and chitosan-Cl have a hypocholesterolemic effect comparable with that of cholestyramine (American Journal of Clinical Nutrition 33-April 1980, pages 787–793).

A new polysaccharide has now been prepared constituted essentially by units of D-glucosammonium salts, of formula:

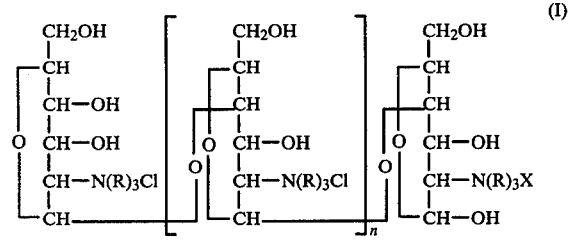

in which R is alkyl of 1-6 carbon atoms, and n is a whole number between 1000 and 2000, $X = Cl, CH_3O-SO_3^-, SO_4^{--}$.

The products of formula (I) have proved to be highly soluble in water and stable in aqueous solution from pH 1 to pH 7. They are therefore stable in particular at the pH of the gastric juices.

As initially stated, the products of formula (I) are prepared preferably from natural chitin by deacetylation in a nitrogen stream with 50% NaOH. The chitosan obtained in this manner has a residual content of acetyl groups of about 3%, an average molecular weight of about 140,000, and is highly crystalline.

It has been found that chitosan cannot be quaternised under the conditions normally used for preparing quaternary ammonium salts, but must be activated and quaternised under suitable critical conditions.

The preparation process according to the present invention comprises the following stages: preparation of a 10% v/v solution of chitosan in acetic acid; precipitation of the polysaccharide by adding NaOH at a concentration of between 0.5 and 15% w/w under strong stirring. The purpose of this treatment is to modify the morphology and supermolecular structure of the chitosan by transforming it into a reactive form.

The chitosan activated in this manner is preferably brought into the reaction medium by suitable exchange of solvents which prevent it returning to an inactive morphological form. A particularly suitable reaction medium has been found to be sulpholane, a solvent of high dielectric constant which does not give rise to secondary reactions with the alkylating agent, in particular with alkyl chloride RCl, or with the dialkylsulphate of formula $R_2SO_4$, in which R is as heretofore defined.

The quaternisation reaction is carried out with a chitosan solution having a concentration of about 2.5% (w/v), by adding the alkyl chloride in an excess of about 10% (v/v) over the stoichiometric, and maintaining the temperature between 40° and 90° for a time of between 2 and 24 hours, according to the alkyl chloride used.

The quaternisation reaction is also carried out in alcoholic ambient with dialkylsulphate, in reaction time considerably lower, about 1 hour.

By following this process, a product is obtained having a quaternisation level of between 80 and 93%, according to the reaction time.

The product has been found to be completely soluble in water, and completely stable during storing and under physiological pH and ionic force conditions.

In order to make the process according to the present invention more reproducible, some examples of practice realization are described hereinafter by way of non-limiting example.

EXAMPLE 1

20 g of powdered chitin are added to 800 ml of NaOH in stainless steel vessels and heated to 150° C. for 1 hour in a nitrogen atmosphere.

After cooling, the resultant chitosan is filtered off, washed in water until neutral, then with ethanol and ether, to give a yield of 15 g.

The chitosan is dissolved in 500 ml of 10% acetic acid, and the concentrated solution is precipitated in a 1 N NaOH solution under stirring. The precipitate is filtered off, washed with water until neutral, dried, and dispersed in 300 ml of sulphonate. 10 ml of methyl chloride are added, the mixture is heated to 120° C. in an autoclave, and allowed to react for 15 hours.

The product is filtered off, washed with acetone and dried.

Elementary analysis: C=33.37%; H=5.96%; N=4.50%; Cl=20.54%.

EXAMPLE 2

15 g of chitosan prepared as in example 1 are dispersed in nitrobenzene and treated with ethyl chloride in an autoclave for 15 hours at 120° C. under stirring. The product is washed with acetone and dried.

Elementary analysis: C=36.42%; H=6.20%; N=4.32%; Cl=15%.

EXAMPLE 3

25 g of chitosan prepared as in example 1 are dispersed in 250 ml of 95% ethanol and treated with 30 ml of $(CH_3O)_2$ for 1 hour at ambient temperature.

The product is washed with ethanol and after with acetone up to complete elimination of $(CH_3O)_2SO_2$ unreacted.

Elementary analysis: C=37.96%; H=6.66%; N=4.46%; S=10.14%.

The products according to the present invention were used in a series of pharmacological and toxicological tests, of which certain significant results obtained with the product ammonium triethyl chloride, ET 504, are given in comparison with the more strictly analogous compounds (chitin, chitosan and chitosan-Cl) and in comparison with cholestyramine, which is the best resin of hypocholesterolemic power at present available.

TOXICOLOGICAL TESTS

The DL 50 was determined for the product ET 504 by oral administration in rats of the Sprague-Dawley stock of both sexes and mice of the Swiss stock of both sexes. The DL 50 for both species was found to be greater than 5 g/kg.

The three month toxicity in the rat and Beagle dog was also determined, with three doses. Up to a dose of 1 g/kg there were no alterations imputable to the product ET 504 either in the rat or in the dog.

PHARMACODYNAMICS

Effect on hypercholesterolemia induced by a cholesterol enriched diet in rats.

This study was carried out on male rats of the Sprague-Dawley stock weighing 200 g, which were divided into eight groups of 10 rats each. The treatment for each group was established as follows:

1st group rats kept under normal diet (controls)
2nd group rats kept under a cholesterol-enriched Nath diet
3rd group rats kept under a cholesterol-enriched + 2% chitin
4th group rats kept under a cholesterol-enriched + 2% chitosan
5th group rats kept under a cholesterol-enriched + 2% chitosan-Cl
6th group rats kept under a cholesterol-enriched + 2% cholestyramine
7th group rats kept under a cholesterol-enriched + 1% ET 504
8th group rats kept under a cholesterol-enriched + 2% ET 504

All the products were finely ground in order to obtain a particle size of between 60 and 100 mesh.

The animals were stalled under standard ambient temperature and humidity conditions, and assumed the products at the aforesaid concentrations in their diet pellets.

After 30 days of treatment they were killed cutting the carotid artery, and the total serous cholesterol was determined (Person and coll.; J. Clin. Endocrin. Metab. 12, 1245, 1952).

Table 1 shows the mean values for each group of rats under consideration, together with the standard error and statistical significance of the difference evaluated by means of the Student t test. The Nath diet (Nath and coll.J.Nutr. 67, 289–1959) produces a considerable increase in the cholesterolemia, which is little antagonised by chitin, whereas chitosan, chitosan-Cl and cholestyramine at a concentration of 2% in the food are able to lower the cholesterolemia in a very evident manner with high statistical significance.

Cholestyramine proves more active than chitosan but without any statistically significant variations compared therewith.

ET 504 at a concentration of 1% in the diet is able to effect a hypocholesterolemic activity greater than that of cholesterol at 2% ($P<0.01$).

When the ET 504 is administered at a concentration of 2%, it further lowers the cholesterolemia to values which are clearly lower than those of the controls.

TABLE 1

Mean values and standard deviation of the total serous cholesterol in the different groups of rats

| Group | Treatment | Total serous cholesterol mg/dl | P |
|---|---|---|---|
| 1 | Normal diet (controls) (10) | 87.3 ± 4.1 | |
| 2 | Diet of Nath and coll. (10) | 260.8 ± 10.3 | |
| 3 | Diet of Nath and coll. + 2% chitin (9) | 241.4 ± 8.6 | & |
| 4 | Diet of Nath and coll. + 2% chitosan (10) | 97.6 ± 6.3 | && |
| 5 | Diet of Nath and coll. + 2% chitosan-Cl (10%) | 103.8 ± 6.9 | && |
| 6 | Diet of Nath and coll. + 2% cholestyramine (10) | 95.2 ± 5.4 | && |
| 7 | Diet of Nath and coll. + 1% ET 504 (10) | 78.6 ± 3.2 | **&& |
| 8 | Diet of Nath and coll. + ET 504 (10) | 62.5 ± 2.8 | **&& |

The numbers in parentheses indicate the number of rats used for determining the cholesterol
&$P < 0.05$ compared with the 2nd group
&&$P < 0.01$ compared with the 2nd group
**$P < 0.01$ compared with the 6th group

EFFECTS ON HYPOCHOLESTEROLEMIA AND AORTIC LIPIDOSIS INDUCED BY CHOLESTEROL-ENRICHED DIETS IN THE RABBIT

This study was carried out on adult male New Zealand rabbits divided into eight groups of ten animals each.

The treatment for each group was established as follows:

| | |
|---|---|
| 1st group | rabbits kept under normal diet (controls) |
| 2nd group | rabbits kept under normal diet + 1 g/day cholesterol |
| 3rd group | rabbits kept under normal diet + 1 g/day cholesterol + 1 g/day chitin |
| 4th group | rabbits kept under normal diet + 1 g/day cholesterol + 1 g/day chitosan |
| 5th group | rabbits kept under normal diet + 1 g/day cholesterol + 1 g/day chitosan-Cl |
| 6th group | rabbits kept under normal diet + 1 g/day cholesterol + 1 g/day cholestyramine |
| 7th group | rabbits kept under normal diet + 1 g/day cholesterol + 0.5 g/day ET 504 |
| 8th group | rabbits kept under normal diet + 1 g/day cholesterol + 1 g/day ET 504 |

The animals were stalled under standard ambient temperature and humidity conditions. The 1 g/day of cholesterol was suspended in arachis oil and the products in 10% gum arabic mucilage and administered by means of a gastric probe.

After 30 days of treatment they were killed by cutting the carotid artery, and the total serous cholesterol and the cholesterol contained in the aorta were determined.

Table 2 shows the mean values for each group of rabbits under consideration, together with the standard error and statistical significance of the differences evaluated by means of the Student t test.

It can be observed that by administering ET 504 at a dose of 0.5 g/day, a hypocholesterolemic effect is obtained which is completely analogous to that of cholestyramine at a dose of 1 g/day, and greater than that of chitin and chitosan at 1 g/day.

However when ET 504 is administered at a dose of 1 g/day, there is a lowering of the total serous cholesterol which is statistically better than that of cholestyramine at the same dosage ($P<0.01$).

In this respect, with 1 g/day of ET 504, the cholesterolemia attains values equal to those of the controls, namely 80 mg/dl.

Lipid infiltration of the aorta is also lowered by administering ET 504 at a dose of 0.5 g/day is a manner analogous to cholestyramine at a dose of 1 g/day.

Chitosan and chitosan-Cl are relatively less active.

By administering ET 504 at a dose of 1 g/day it is possible to drastically lower cholesterolemic infiltration of the aorta to values which approach those of the control rabbits.

The difference between the total aortic cholesterol values after treatment with ET 504 at a dose of 1 g/day and the values obtained by administering cholestyramine at the same dose is highly significant ($P<0.01$).

TABLE 2

Mean values and standard deviation of the total serous cholesterol and total aortic cholesterol in rabbits

| Group | Treatment | Total serous cholesterol mg/dl | Aortic cholesterol mg/g of fresh tissue | P total serous cholesterol | P total aortic cholesterol |
|---|---|---|---|---|---|
| 1 | Normal controls (10) | 82.6 ± 5.1 | 1.41 ± 0.12 | | |
| 2 | Cholesterol 1 g/day (9) | 621.4 ± 53.7 | 6.08 ± 0.23 | | |
| 3 | Cholesterol + chitin 1 g/day (8) | 502.8 ± 41.4 | 5.92 ± 0.24 | & | |
| 4 | Cholesterol + chitosan 1 g/day (9) | 115.9 ± 18.2 | 2.53 ± 0.17 | && | && |
| 5 | Cholesterol + chitosan-Cl 1 g/day (9) | 123.5 ± 10.3 | 2.64 ± 0.20 | && | && |
| 6 | Cholesterol + cholestyramine 1 g/day (9) | 107.4 ± 9.6 | 2.48 ± 0.17 | && | && |
| 7 | Cholesterol + ET 504 0.5 g/day (9) | 102.7 ± 8.9 | 2.31 ± 0.18 | && | && |
| 8 | Cholesterol + ET 504 1 g/day (9) | 80.4 ± 6.8 | 1.59 ± 0.15 | && ** | && ** |

The numbers in parentheses indicate the number of rabbits used for the determination
&P < 0.05 compared with the 2nd group
&&P < 0.01 compared with the 2nd group
**P < 0.01 compared with the 6th group

EFFECT ON LIPIDOSIS INDUCED BY A CHOLESTEROL-ENRICHED DIET IN THE CHICKEN

This study was carried out on adult chickens of both sexes divided into eight groups of twelve chickens each.

| | |
|---|---|
| 1st group | chickens kept under normal diet (controls) |
| 2nd group | chickens kept under a diet enriched with 1% cholesterol |
| 3rd group | chickens kept under a diet enriched with 1% cholesterol + 1% chitin |
| 4th group | chickens kept under a diet enriched with 1% cholesterol + 1% chitosan |
| 5th group | chickens kept under a diet enriched with 1% cholesterol + 1% chitosan-Cl |
| 6th group | chickens kept under a diet enriched with 1% cholesterol + 1% cholestyramine |
| 7th group | chickens kept under a diet enriched with 1% cholesterol + 0.5% ET 504 |
| 8th group | chickens kept under a normal diet enriched with 1% cholesterol + 1% ET 504 |

The animals were stalled under standard ambient temperature and humidity conditions. The cholesterol and products were added to the various types of pellets in accordance with the established concentrations.

After 60 days of treatment they were killed by cutting the carotid artery, and the total cholesterol in the serum, aorta, heart and liver were then determined.

Table 3 shows the overall results obtained for the various groups of chickens under consideration together with the statistical significance of the difference evaluated by the Student t test.

Cholesterol administration leads to a large increase in the total serous cholesterol, with cholesterolemic infiltration of the aorta, heart and liver.

Simultaneous administration of 1% chitin induces a very modest lowering of the serous cholesterol and tissue cholesterol.

Chitosan, chitosan-Cl and cholestyramine at a concentration of 1% in the food produce a considerable lowering of the serous, aorta, heart and liver cholesterol (P<0.01).

Cholestyramine shows better activity, though not statistically significant.

The compound ET 504 at a concentration of 0.5% is able to lower the total serous cholesterol and the cholesterol of the organs under consideration in a manner which is superior to 1% cholestyramine, although not significant.

At a dose of 1%, the compound ET 504 leads to a lowering of the total serous cholesterol to below normal values, and effectively antagonises its accumulation in the organs under consideration.

The total cholesterol in the serum, aorta, heart and liver after administering ET 504 are significantly less than after administering cholestyramine at the same concentration in the diet (P<0.01).

Journal of Clinical Nutrition), it can also be seen that whereas with cholestyramine and chitosan-Cl the best results are obtained with diets containing 5% of these products, with the new products according to the invention there is already an excellent result (cholesterol at a lower level than in the controls) with diets containing 1% of the hypocholesterolemic compound.

I claim:

1. A polysaccharide of formula:

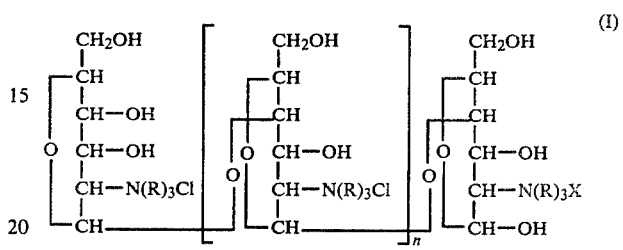

in which R is alkyl of 1–6 carbon atoms, n is a whole number between 1000 and 2000, $X=Cl$, $CH_3OSO_3^-$, $SO_4^{--}$.

2. A process for preparing a polysaccharide of formula:

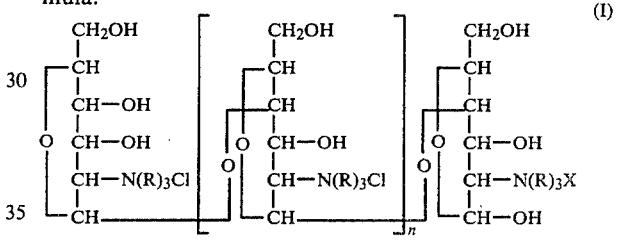

TABLE 3

Mean values and standard deviation of the total serous, aortic, cardiac and hepatic cholesterol in chickens

| Group | Treatment | Total serous cholesterol mg/dl | Aorta: total cholesterol mg % | Heart: total cholesterol mg % | Liver: total cholesterol mg % |
|---|---|---|---|---|---|
| 1 | Normal diet (12) | 148.7 ± 9.2 | 163.5 ± 7.4 | 171.8 ± 8.2 | 486.1 ± 25.8 |
| 2 | Diet enriched with 1% cholesterol (DAC) (11) | 402.1 ± 34.3 | 384.9 ± 29.6 | 226.5 ± 14.8 | 1510.6 ± 79.5 |
| 3 | DAC + 1% chitin (12) | 374.7 ± 31.0 | 356.7 ± 25.7 | 204.6 ± 12.9 & | 1260.8 ± 71.9 & |
| 4 | DAC + 1% chitosan (12) | 243.2 ± 21.8 && | 221.5 ± 14.2 && | 208.4 ± 11.5 && | 784.7 ± 43.5 && |
| 5 | DAC + 1% chitosan-Cl (11) | 230.4 ± 18.3 && | 213.8 ± 12.7 && | 204.2 ± 10.9 && | 760.4 ± 39.6 && |
| 6 | DAC + 1% cholestyramine (12) | 218.5 ± 14.6 && | 204.2 ± 10.8 && | 199.5 ± 8.8 && | 752.9 ± 38.6 && |
| 7 | DAC + 0.5% ET 504 (12) | 202.5 ± 13.9 && | 191.6 ± 9.5 && | 198.9 ± 7.2 && | 724.6 ± 36.3 && |
| 8 | DAC + 1% ET 504 (12) | 136.4 ± 8.2 &&** | 180.2 ± 8.4 &&** | 185.3 ± 7.0 &&** | 692.9 ± 32.6 &&** |

The numbers in parentheses indicate the number of chickens used for the determinations.
&P < 0.05 compared with the 2nd group
&&P < 0.01 compared with the 2nd group
**P < 0.01 compared with the 6th group In conclusion, from the aforesaid data it is apparent that the new polysaccharide according to the invention has a hypocholesterolemic effect which is considerably more marked than cholestyramine.

Such an activity was absolutely unforseeable due to the fact that chitin is practically free from activity, while chitosan and chitosan-Cl have an activity which is comparable with or less than that of cholestyramine.

From a comparison between the data of the present invention and the data of the known art (American starting from chitin by deacetylation of chitosan, characterized in that the chitosan is activated by dissolving in acetic acid in the proportion of 10% v/v and reprecipitation with NaOH at a concentration of between 0.5 and 15% w/w, and is then quaternised by treatment with an alkylating agent of formula RX, in which R is alkyl of 1-6 carbon atoms, X=Cl, $CH_3OSO_3^-$, $SO_4^{--}$, in an inert organic solvent at a temperature of 40°–90° C.

3. A process as claimed in claim 2, wherein the quaternisation reaction is carried out in an excess of alkyl chloride of formula RCl in which R is alkyl of 1–6 carbon atoms, in sulpholane, at a temperature of 40°–90° C., for a time of between 2 and 24 hours.

4. A process as claimed in claim 2, wherein the quaternisation reaction is carried out with dimethyl sulphate, in alcoholic solvent, at a temperature of between 20°–30° C., for a time of 1–2 hours.

5. A therapeutic composition comprising a hypocholesterolemically effective amount of a compound as defined in claim 1 and a pharmaceutically acceptable carrier.

* * * * *